United States Patent [19]

Lenzen et al.

[11] Patent Number: 4,815,543
[45] Date of Patent: Mar. 28, 1989

[54] ACTIVATED ROCK CUTTING ASSEMBLY

[75] Inventors: Dieter Lenzen, Lethmate; Philip Bechem, Hagen, both of Fed. Rep. of Germany

[73] Assignee: General Mining Union Corporation Limited, Johannesburg, South Africa

[21] Appl. No.: 871,881

[22] Filed: Jun. 9, 1986

[51] Int. Cl.$^4$ .................. E21B 10/08; E21B 10/12
[52] U.S. Cl. ........................ 175/350; 51/169; 125/5; 175/398; 299/86; 409/141; 409/200
[58] Field of Search ............ 299/29, 81, 14, 86, 299/89; 175/398, 343, 354, 371, 350, 355, 373, 376, 382; 125/5; 172/46, 40, 120, 123, 125, 118; 409/141, 231, 234, 236, 200; 51/169

[56] References Cited

U.S. PATENT DOCUMENTS

| | | | |
|---|---|---|---|
| 1,305,978 | 6/1919 | Spence | 51/169 |
| 1,657,609 | 1/1928 | Crickmer | 175/343 |
| 1,935,654 | 11/1933 | Millican | 175/351 |
| 2,958,165 | 11/1960 | Hoffman | 51/169 |
| 3,860,292 | 1/1975 | Bechem | 299/86 |
| 3,967,416 | 7/1976 | Birkenstock et al. | 51/169 |
| 4,049,318 | 9/1977 | Fruin | 299/81 |
| 4,736,987 | 4/1988 | Lenzen et al. | 299/86 |

FOREIGN PATENT DOCUMENTS

| | | | |
|---|---|---|---|
| 3301671 | 7/1984 | Fed. Rep. of Germany | 175/398 |
| 403839 | 10/1973 | U.S.S.R. | 175/373 |
| 659720 | 4/1979 | U.S.S.R. | 175/373 |

Primary Examiner—Stephen J. Novosad
Assistant Examiner—David J. Bagnell
Attorney, Agent, or Firm—Jones, Tullar & Cooper

[57] ABSTRACT

A rock cutting assembly consists of a rock cutting roller, a shaft on which it is mounted, and a means for varying the mass of the assembly about the drive axis, to vary the balance of the assembly about that axis. Preferably two rollers are mounted on a common drive axis, the axes of the rollers being diametrically opposed and eccentrically displaced by the same distance from the drive axis. The mass-varying means may be a cavity or cavities in the hub or hubs, with means to introduce fluid into and extract it from the cavity or cavities. Alternatively the means may be a weight mounted to permit adjustment to vary the degree of imbalance.

15 Claims, 3 Drawing Sheets

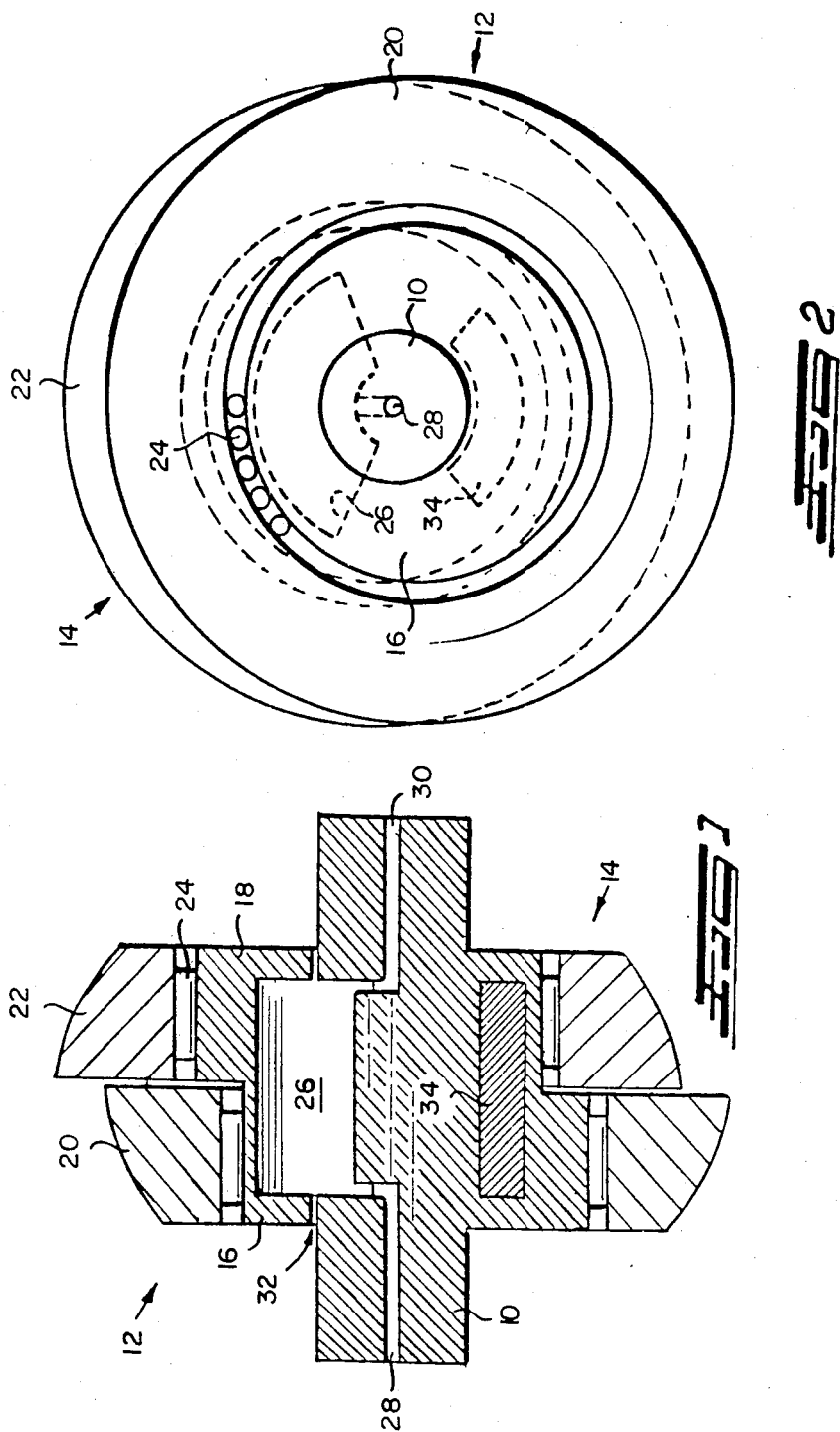

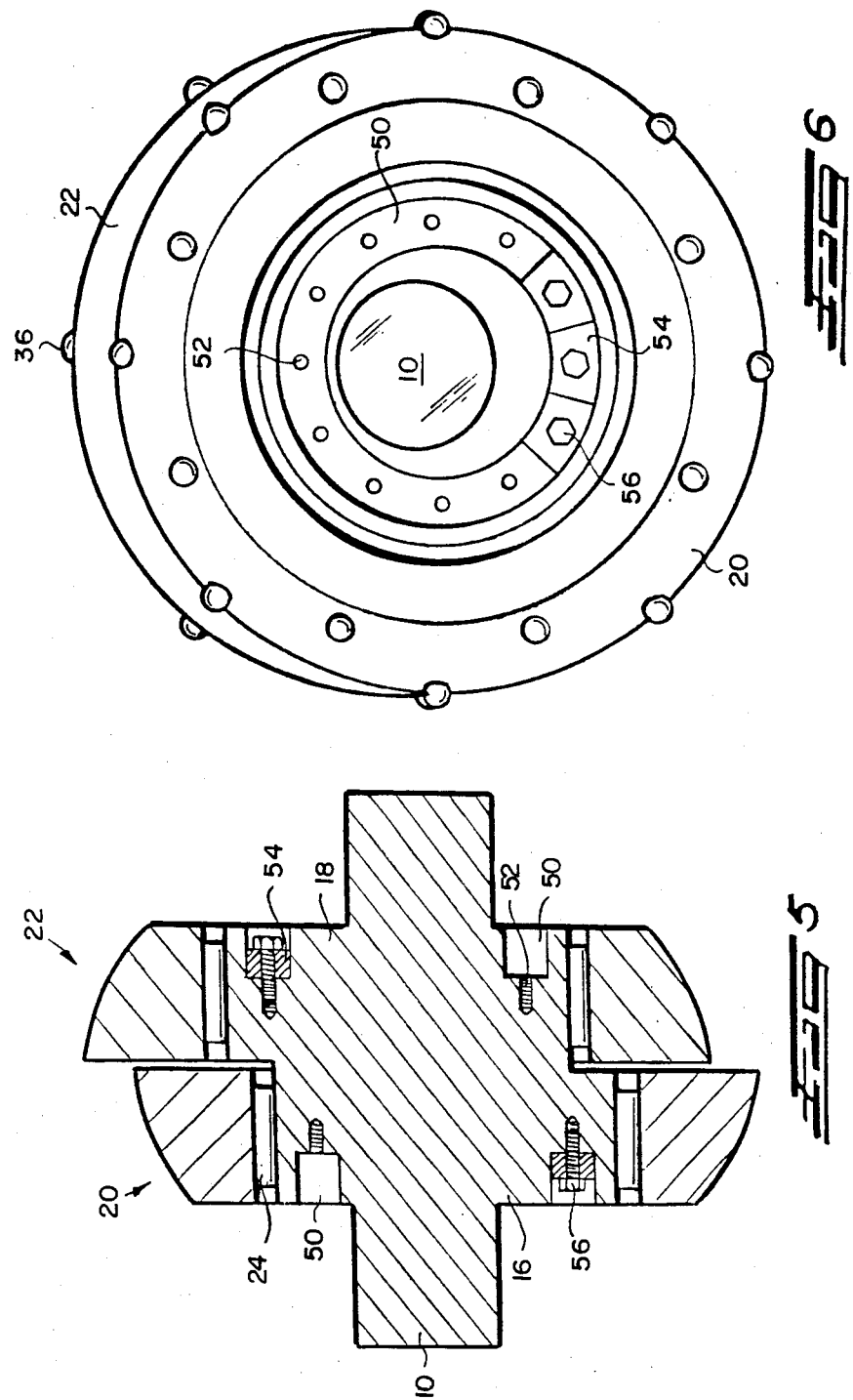

ACTIVATED ROCK CUTTING ASSEMBLY

FIELD OF THE INVENTION

This invention relates to an activated or radially vibratable rock cutting assembly or tool for use with a machine which is capable of rotating it for the purpose of rock cutting.

In this specification the term rock cutting is to be taken to include any rock breaking or comminution process which will result in the cutting of rock.

SUMMARY OF THE INVENTION

An activated rock cutting assembly according to the invention includes a rock cutting roller which is eccentrically mounted on a drive arrangement and means for varying the mass of the assembly about the drive axis of the drive arrangement so that the balance of the assembly may be variable about the drive axis.

In a preferred form of the invention the assembly includes two of the rock cutting rollers which are located on a common drive axis with the axis of each roller being eccentrically displaced by a common distance and in opposite direction from the drive axis.

Further according to the invention the or each rock cutting roller is composed of a hub portion to which the drive arrangement is attached and an annulus which is rotatable about the hub and carries rock cutting formations.

Conveniently the rock cutting formations are buttons, bits, teeth, picks and the like.

Further according to the invention the hub portions of the rollers are integral with each other and the hub portions of the outer rollers of the assembly each carry a support shaft the axis of which lies on the drive axis of the assembly.

In one form of the invention the mass varying means is at least one cavity in the hub portion of the assembly and the assembly includes means for introducing a fluid into and extracting it from the or each cavity to cause the required degree of imbalance of the assembly.

In another form of the invention the mass varying means is a weight which is movable relatively to the common axis to vary the degree of imbalance of the assembly.

BRIEF DESCRIPTION OF THE DRAWINGS

The invention is now described by way of example only with reference to the drawings in which:

FIGS. 1 and 2 are respectively a cross-sectioned end elevation and a side elevation of one embodiment of the rock cutting assembly of the invention;

FIGS. 5 and 6 illustrate yet a further embodiment of a rock cutting assembly according to the invention.

DETAILED DESCRIPTION OF THE ILLUSTRATED EMBODIMENTS OF THE INVENTION

Figure 4:
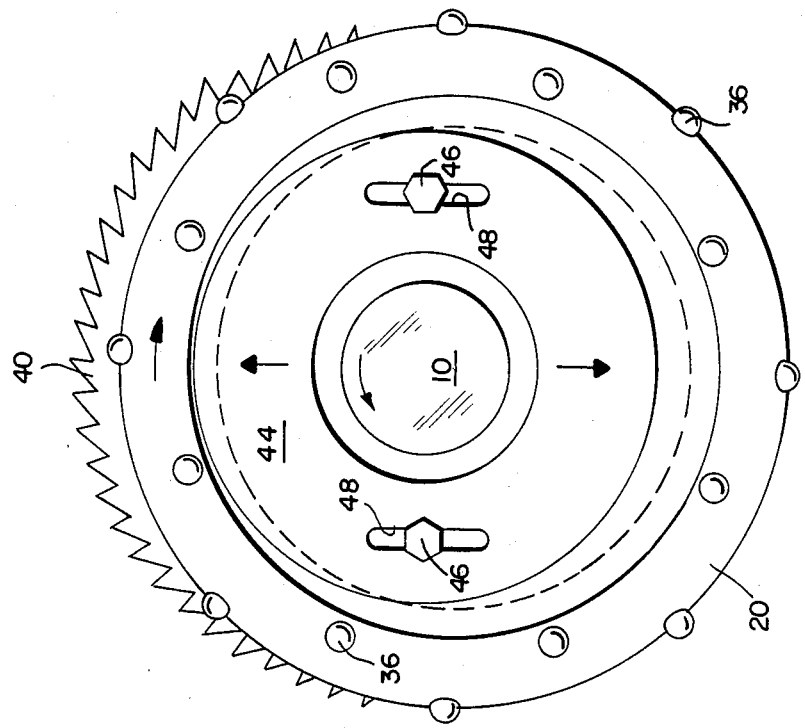
FIGS. 3 and 4 are similar views to that of FIGS. 1 and 2 of a second embodiment of the assembly which in turn illustrates two versions of cutters for use with the assembly.

The roller assembly of the invention is shown in FIGS. 1 and 2 of the drawings to include a shaft 10 and two rollers 12 and 14, the axes of which are eccentrically displaced by equal distances from and on opposite sides of the shaft axis.

The rollers are shown to consist of hub portions 16 and 18 which are integral with the shaft 10 and peripheral annuli 20 and 22 which are freely journalled for rotation on the hubs on suitable bearings 24.

A chamber 26 is located in the hub portion of the rollers on one side of the shaft axis. A port 28 leads from the shaft to the chamber and another port 30 from the chamber to the opposite end of the shaft. Small water passages 32 lead from the chamber 26 on to the outer surfaces of the shaft.

A counter-weight 34 of suitable mass is located in the hub portion of the assembly opposite the chamber 26 to balance the chamber when it is water filled.

In this embodiment of the invention the outer surfaces of the annuli 20 and 22 carry rock cutting studs 36 (shown only in FIGS. 4 and 6) which are suitable for cutting the type of rock on which the cutter is to be used. The rock cutting formations on the annuli are, however, not limited to the buttons 36 but could consist of teeth, rock picks, cutting bits, roller discs and the like. The formations could be arranged in the annuli so that they are abraided away progressively and could even consist of a layer or ring of hard or highly abrasive material.

When the shaft 10 is driven with the annuli pressed to a rock face the reaction forces on the annuli will tend to rotate the annuli in a direction counter to the shaft.

In use, the shaft 10 is mounted in and driven by a suitable machine. Preferably the shaft bearings are resiliently mounted. The machine is adapted to introduce water into and extract it from the chamber 26 in a controlled fashion so that when the chamber is water filled the water and the counter-weights balance each other and the machine is subjected to minimal vibration. To vary the amplitude of vibration or activation of the cutter water is withdrawn from the chamber 26 until the required degree of activation is achieved with maximum activation being reached when the chamber is empty of water.

While the chamber is filled with water under pressure small jets of water are emitted under pressure from the passages 32 to minimise the ingress of dust and other dirt into the shaft bearings. When the chamber 26 is empty pressure air could be fed to the chamber for the same purpose.

This embodiment of the invention is not limited to the precise details as herein described. For example, the chamber 26 could be counter-balanced by a second substantially identical chamber in place of the counter-weight 34. In this event the assembly would be unbalanced or activated by introducing water into one of the chambers.

In FIGS. 3 to 6 like reference numbers denote like components to those illustrated and described with reference to FIGS. 1 and 2.

Figure 3:
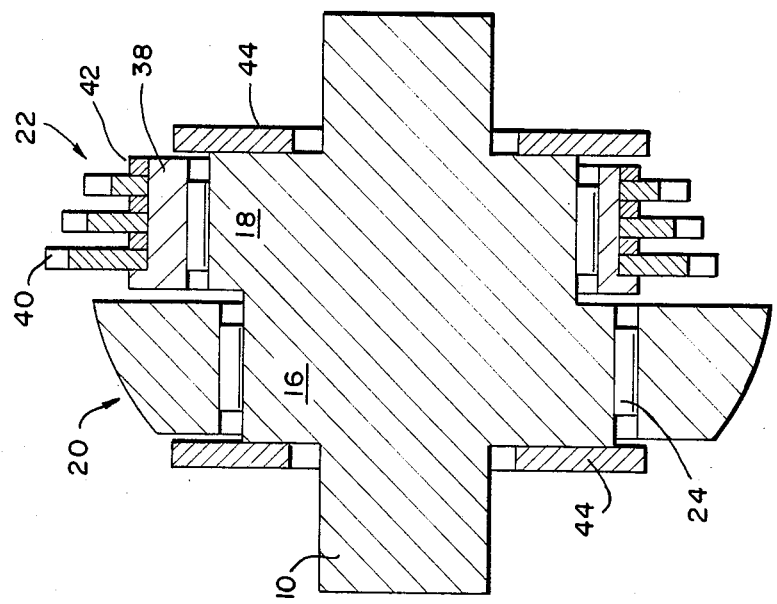

In normal use each of the assembly annuli 20 and 22 would carry the same type of rock cutting formations and the different types illustrated in the FIG. 3 and 4 embodiment of the assembly are by way of illustrative example only.

The annulus 22 of the roller 18 in FIG. 3 is shown to consist of a ring 38 which carries three hard metal saw blades 40, two spacer rings and a lock ring 42 which is fastened in any suitable manner to the ring 38. The blades 40 and the spacer rings which separate them are preferably keyed against relative rotation in any suitable manner to the ring 38.

In practice the blades 40 would be of a larger diameter than those shown in the drawing for their teeth to be well clear of the remainder of the assembly. The teeth of the blades are preferably provided with hard metal cutting tips.

In this embodiment of the invention the activation of the assembly is achieved by movable heavy metal holed plates 44 which are locked to the hubs 16 and 18 of the rollers over the shaft 10 by bolts 46. The bolts pass through slots 48 in the plates so that the plates may be movable relatively to the shaft 10 in the direction of the arrows in FIG. 4. With the plates concentrically located about the shaft 10, as shown in the drawings, the assembly is balanced about the shaft axis with the required degree of activation being achieved by moving the plates in one way or the other in the direction of the arrows. The plates are moved by releasing the bolts and again tightening them in the required position over the slots 48. The plates 44 could carry index marks adjacent the slots to ensure that both plates are moved by equal distances relative to the bolts 46.

In the FIG. 5 and 6 embodiment the hubs 16 and 18 of the assembly carry annular grooves 50 which have spaced bolt holes 52 in their bases. This assembly is activated by repositioning, adding or subtracting weights 54 from the grooves 50 in a desired relationship on either side of the assembly. The weights are made from heavy metal, are holed and held in the grooves 50 by bolts 56 which engage in the holes 52.

Although only double roller assemblies have been illustrated and described in this specification, single roller assemblies are included in the scope of the invention. The single roller assemblies could include any one of the rollers described above and could be driven from one side only.

The invention is not limited to the precise constructional details as herein described. For example, the rollers 12 and 14 could be separate from and rotatably mounted on the shaft 10 which would then pass through them with any suitable means being employed to drive the roller hubs on the shaft. Additionally the assembly could, in the case of multiple rollers, include three or even more offset rollers to increase the impact frequency of the assembly rock cutting formations on the rock being cut. It is essential, however, that the axes of the eccentric rollers are so arranged around the shaft axis that the rollers counter-balance each other in the assembly.

We claim:

1. An activated rock cutting assembly including:
    support means having a drive axis,
    a rock cutting roller mounted on said support means, said roller including at least a hub portion and a peripheral annulus mounted on said hub, said roller having an axis which is eccentrically displaced from said drive axis; and
    mass-varying means associated with said roller for varying the mass of the rock cutting assembly about said drive axis to vary the balance of the assembly, said mass-varying means including at least one cavity in said hub portion, and means for introducing a fluid into said cavity.

2. A rock cutting assembly as claimed in claim 1, further including two of said rock cutting rollers mounted on said support means and located on a common drive axis, with the axis of each roller being eccentrically displaced by a common distance and in opposite directions from said drive axis.

3. A rock cutting assembly as claimed in claim 2, in which each rock cutting roller is composed of a hub portion integrally formed with said support means and an annulus which is rotatable about the hub, and rock cutting formations carried on the annulus.

4. A rock cutting assembly as claimed in claim 3, in which the hub portions of said rollers are integral with each other, and wherein said support means comprises a drive shaft for said rock cutting assembly.

5. A rock cutting assembly as claimed in claim 1, in which said hub portion is integrally formed with said support means and said annulus is rotatable about the hub, and further including rock cutting formations carried on said annulus.

6. A rock cutting assembly as claimed in claim 5 in which the cutting formations are a plurality of disc-shaped rock cutting blades.

7. A rock cutting assembly as claimed in claim 1 further including a passage which extends between the cavity and the outer surface of the hub.

8. An activated rock cutting assembly including:
    a rock cutting roller having an axis of rotation;
    a support shaft for the roller, the support shaft having a drive axis which is parallel to and displaced from the axis of rotation of the roller; and
    mass-varying means for varying the mass of the roller about the axis of the support shaft between a condition in which the roller is dynamically balanced on the support shaft and a predetermined degree of unbalance on the support shaft, said mass-varying means comprising weight means adjustably secured to the exterior of said roller.

9. A rock cutting assembly as claimed in claim 8, including two rock cutting rollers each having a corresponding axis of rotation; said two rock cutting rollers being located on a common support shaft drive axis, with the axis of each roller being parallel to, and eccentrically displaced by a common distance and in opposite directions from, the drive axis.

10. A rock cutting assembly as claimed in claim 9, wherein each rock cutting roller includes a hub portion and an annulus which is rotatable about the hub.

11. A rock cutting assembly as claimed in claim 10, wherein the hub portions of the rollers are integral with each other.

12. A rock cutting assembly as claimed in claim 8, wherein the means for varying the mass of the roller is a weight which is movable relative to the axis of the support shaft.

13. A rock cutting assembly as claimed in claim 8 in which the means for varying the mass of the roller is a cavity in the roller and means for introducing a fluid into and extracting it from the cavity.

14. A rock cutting assembly as claimed in claim 8, wherein said weight means includes an annular plate having an axis, said plate surrounding said support shaft and secured to said roller for adjustment of said plate axis with respect to said drive axis.

15. A rock cutting assembly as claimed in claim 8, wherein said weight means comprises at least one annular groove formed in the exterior surface of, and being concentric with said roller, and means securing at least one weight within said annular groove.

* * * * *